US 6,731,468 B2

(12) United States Patent
Williams et al.

(10) Patent No.: US 6,731,468 B2
(45) Date of Patent: May 4, 2004

(54) PAWL LATCH FOR RAMP LOADING HARD DISK DRIVERS

(75) Inventors: Kelly Williams, Brentwood, CA (US); Ron Kirkish, Campbell, CA (US); Joseph Chang, Milipitas, CA (US)

(73) Assignee: Samsung Electronics Co., Ltd. (KR)

( * ) Notice: Subject to any disclaimer, the term of this patent is extended or adjusted under 35 U.S.C. 154(b) by 201 days.

(21) Appl. No.: 10/057,201

(22) Filed: Jan. 23, 2002

(65) Prior Publication Data

US 2002/0149882 A1 Oct. 17, 2002

Related U.S. Application Data

(60) Provisional application No. 60/283,403, filed on Apr. 11, 2001.

(51) Int. Cl.$^7$ .................................................. G11B 5/54
(52) U.S. Cl. .................. 360/256; 360/256.4; 360/265.1
(58) Field of Search .............................. 360/256, 256.1, 360/256.2, 256.3, 256.4, 256.5, 256.6, 265.1

(56) References Cited

U.S. PATENT DOCUMENTS

| 4,536,867 A | | 8/1985 | Robinson |
| 4,577,756 A | | 3/1986 | Hennessy et al. |
| 4,879,617 A | | 11/1989 | Sampietro et al. |
| 5,216,662 A | | 6/1993 | Stefansky et al. |
| 5,262,912 A | | 11/1993 | Hudson et al. |
| 5,291,359 A | | 3/1994 | Wolter |
| 5,299,081 A | | 3/1994 | Hatch et al. |
| 5,305,169 A | | 4/1994 | Anderson et al. |
| 5,363,261 A | | 11/1994 | Eckberg et al. |
| 5,369,538 A | * | 11/1994 | Moe et al. ................ 360/265.1 |
| 5,455,728 A | | 10/1995 | Edwards et al. |
| 5,715,119 A | | 2/1998 | Williams et al. |
| 5,734,527 A | * | 3/1998 | Reinhart .................. 360/256.2 |
| 5,745,319 A | | 4/1998 | Takekado et al. |
| 5,768,058 A | * | 6/1998 | Hofland .................... 360/256.1 |
| 5,793,572 A | * | 8/1998 | Lalouette et al. ........ 360/256.1 |
| 5,812,346 A | | 9/1998 | Williams et al. |
| 5,870,256 A | | 2/1999 | Khanna et al. |
| 5,875,075 A | | 2/1999 | Hickox |
| 5,880,904 A | | 3/1999 | Mizoshita et al. |
| 5,982,587 A | | 11/1999 | Alagheband et al. |
| 6,028,745 A | | 2/2000 | Nguyen et al. |
| 6,091,587 A | | 7/2000 | Hatch et al. |
| 6,134,077 A | * | 10/2000 | Misso et al. ................. 360/256 |
| 6,163,440 A | * | 12/2000 | Takahashi et al. ....... 360/256.4 |
| 6,185,074 B1 | | 2/2001 | Wang et al. |
| 6,507,461 B1 | * | 1/2003 | Kimura et al. ........... 360/256.4 |
| 6,535,358 B1 | * | 3/2003 | Hauert et al. ............. 360/256.2 |
| 6,542,335 B1 | * | 4/2003 | Misso et al. ............. 360/256.2 |
| 2003/0035246 A1 | * | 2/2003 | Byun et al. ............... 360/256.4 |

FOREIGN PATENT DOCUMENTS

| EP | 0 380 256 | | 1/1990 | |
| JP | 405067380 A | | 3/1993 | |
| JP | 07073620 A | * | 3/1995 | ........... G11B/21/12 |
| JP | 10302418 A | * | 11/1998 | ........... G11B/21/02 |
| WO | WO 93/19460 | | 9/1993 | |
| WO | WO 9610249 A1 | * | 4/1996 | ........... G11B/5/05 |
| WO | WO 00/51126 | | 8/2000 | |

* cited by examiner

Primary Examiner—William Klimowicz
(74) Attorney, Agent, or Firm—Irell & Manella LLP; Jeffrey P. Aiello

(57) ABSTRACT

A latch for securing an actuator arm of a hard disk drive. The latch has a catch portion that can engage a latch portion of the actuator arm. The latch also has a pusher portion and a crash stop portion that engage the actuator arm during movement into a latched position and prevent the latch from rebounding away from the arm. The pusher and crash stop portions eliminate the need for a separate crash stop in the disk drive. Eliminating the separate crash stop component reduces the complexity and cost for mass producing the disk drive.

19 Claims, 4 Drawing Sheets

PAWL LATCH FOR RAMP LOADING HARD DISK DRIVERS

CROSS-REFERENCE TO RELATED APPLICATIONS

This Application is a non-provisional application of Provisional Application No. 60/283,403, filed on Apr. 11, 2001.

BACKGROUND OF THE INVENTION

1. Field of the Invention

The subject matter disclosed generally relates to the field of hard disk drives.

2. Background Information

Hard disk drives contain a plurality of transducers that are magnetically coupled to rotating magnetic disks. The transducers can write and read information onto the rotating disks by magnetizing and sensing the magnetic field of the disks, respectively. The transducers are integrated into heads that are part of a head gimbal assembly (HGA). The HGAs are typically attached to an actuator arm that is pivotally mounted to a base plate of the drive.

Information is typically stored within a plurality of data sectors. The data sectors are located within annular tracks of the disks. The actuator arm has a voice coil that is coupled to a magnet assembly mounted to the base plate. The voice coil and magnet assembly together create a voice coil motor. The voice coil motor can be energized to pivot the actuator arm and move the transducers to different annular tracks of the disks.

Hard disk drives are typically assembled into computer systems such as a portable computer. Movement of the portable computer may induce a rotational acceleration of the disk drive. The rotational acceleration of the disk drive may cause the actuator arm to move about the drive and damage disk drive components. There have been developed a number of latches that secure the actuator arm and prevent undesirable arm movement. The latch is typically engaged when the heads are moved away and unloaded from the disks.

FIG. 1 shows a magnetic latch 1 that can secure an actuator arm 2. The magnetic latch 1 is adjacent to a magnet assembly 3 that is coupled to a voice coil 4 of the arm 2. The actuator arm 2 includes a steel pin 5 that is magnetically attracted to the latch 1. The attractive magnetic force between the pin 5 and latch 1 maintains the position of the actuator arm 2. The actuator arm 2 can only be separated from the latch 1 by providing enough current to the voice coil 4 to create a torque sufficient to overcome the magnetic force. This requires additional power for the hard disk drive, a criteria that is undesirable when used in a portable computer. Additionally, the use of a magnetic latch 1 may require complex actuator speed control that increases the software processing overhead of the drive.

FIGS. 2–4 show an inertia latch 10 that can secure an actuator arm 11 when the disk drive has clockwise rotational acceleration. The inertia latch 10 is normally biased in an open position away from the actuator arm 11. When the disk drive is not writing or accessing information the actuator arm 11 is rotated to park the heads 12 on a ramp 13. The arm 11 also engages a crash stop 14. When the disk drive has a clockwise rotational acceleration the actuator arm 11 moves in a counterclockwise direction. The latch 10 also moves in a counterclockwise direction until a latch hook 15 extends into a notch 16 of the actuator arm 11 as shown in FIG. 3 to secure the arm 11.

As shown in FIG. 4, the latch 10 will move back to the open position when the disk drive is no longer rotationally accelerating. If the hard disk drive has a counterclockwise rotational acceleration, the actuator arm 11 will swing past the latch 10 in a clockwise direction and possibly land on the disks (not shown). This type of latch 10 will not secure the actuator arm 11 for counterclockwise rotational acceleration.

FIGS. 5–7 show a dual lever latch 20 which has a large latch arm 21 that can move a small latch arm 22 into an actuator arm 23. The small latch arm 22 will engage the actuator arm 23 whether the disk drive has clockwise or counterclockwise rotational acceleration. When the disk drive is rotating in a clockwise direction the large latch arm 21 moves in a counterclockwise direction and a first latch pin 24 pulls the small latch arm 22 into the actuator arm 23 as shown in FIG. 6. When the disk drive is rotating in a counterclockwise direction the large latch arm 21 moves in a clockwise direction and a second latch pin 25 pushes the small latch arm 22 into the actuator arm 23 as shown in FIG. 7. The latch 20 will secure the arm 23 regardless of the rotational acceleration direction. This design requires multiple latch components that increases the complexity and cost of mass producing the disk drive.

FIG. 8 shows an impact rebound single lever bi-directional latch 30. The latch 30 has a catch 31 that can engage a corresponding hook portion 32 that extends from an actuator arm 33. When engaged, the hook 32 and catch 31 secure the actuator arm 33 when the disk drive is subjected to a rotational acceleration. The latch 30 includes a tab 34 that is coupled to a magnet (not shown). The tab 34 is attracted to the magnet to pull the latch 30 away from the hook 32 to detach the actuator arm 33.

When the disk drive undergoes a clockwise rotational acceleration the actuator arm 31 and latch 30 will move in a counterclockwise manner. The actuator arm 36 may strike the latch 30 before the hook 32 and catch 31 have engaged. This premature contact may cause the latch to rebound and rotate back in the clockwise direction away from the actuator arm 33. The disk chive includes a crash stop 35 which limits the movement of the latch 30 in the clockwise direction so that the hook 32 will still slide into the catch 31. Having separate latch and stop parts increases the complexity and cost of mass producing the drives. It would be desirable to minimize the number of parts in the latch assembly.

BRIEF SUMMARY OF THE INVENTION

A latch for an actuator arm of a hard disk drive. The latch includes a catch portion, a pusher portion, and a crash stop portion that is located between the catch and pusher portions.

DETAILED DESCRIPTION

Disclosed is a latch to secure an actuator arm of a hard disk drive. The latch has a catch portion that can engage a latch portion of the actuator arm. The latch also has a pusher portion and a crash stop portion that engage the actuator arm during movement into a latched position and prevent the latch from rebounding away from the arm. The pusher and crash stop portions eliminate the need for a separate crash stop in the disk drive. Eliminating the separate crash stop component reduces the complexity and cost for mass producing the disk drive.

Figure 1:
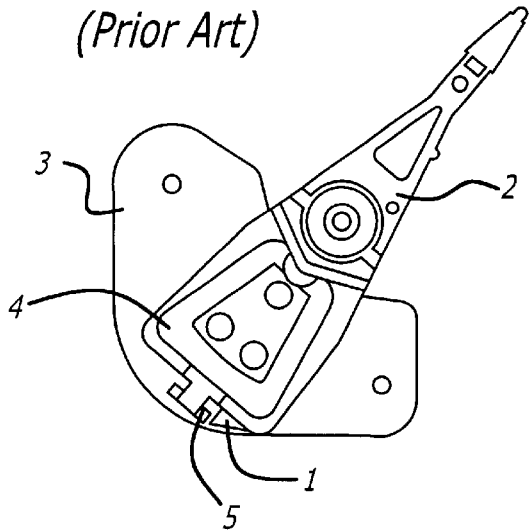
FIG. 1 is a top view of a hard disk drive actuator arm assembly of the prior art.
Figure 8:
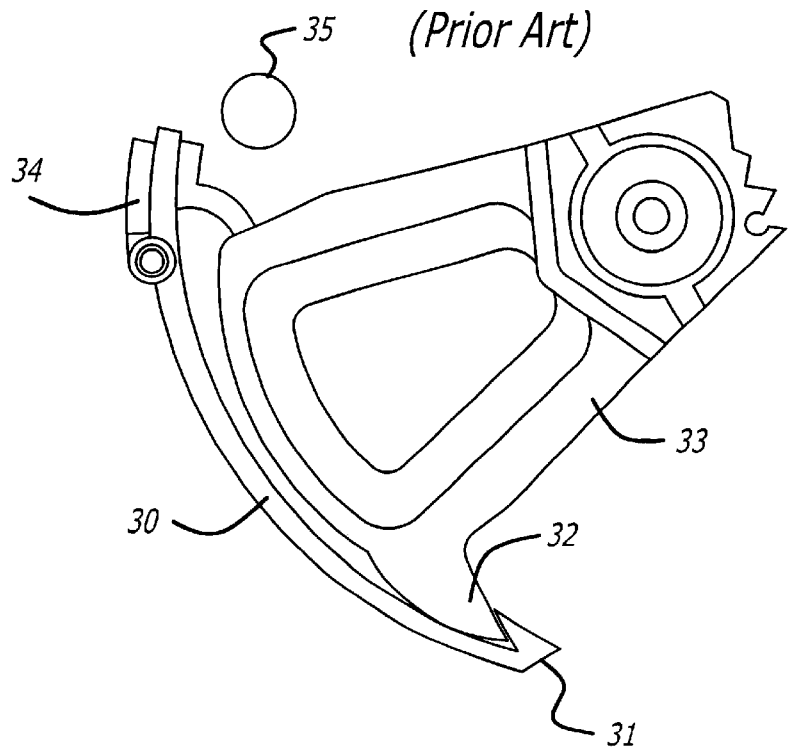
FIG. 8 is a top view of an actuator arm engaging a latch of the prior art.
Figure 2:
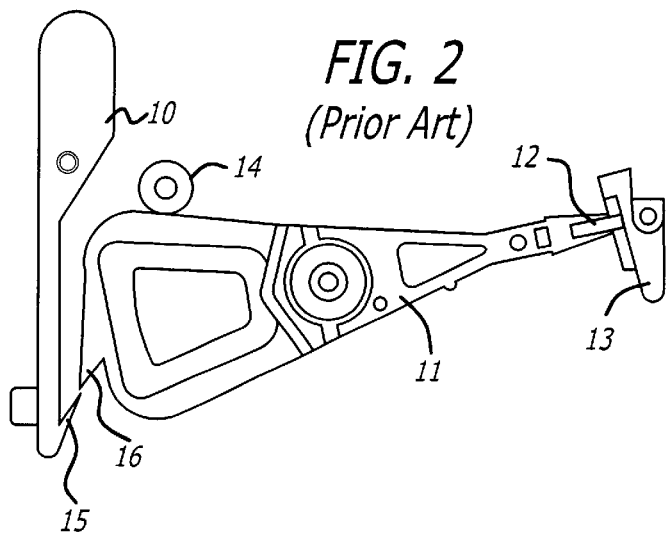
FIGS. 2–4 are top views of another hard disk drive actuator arm assembly of the prior art.
Figure 3:
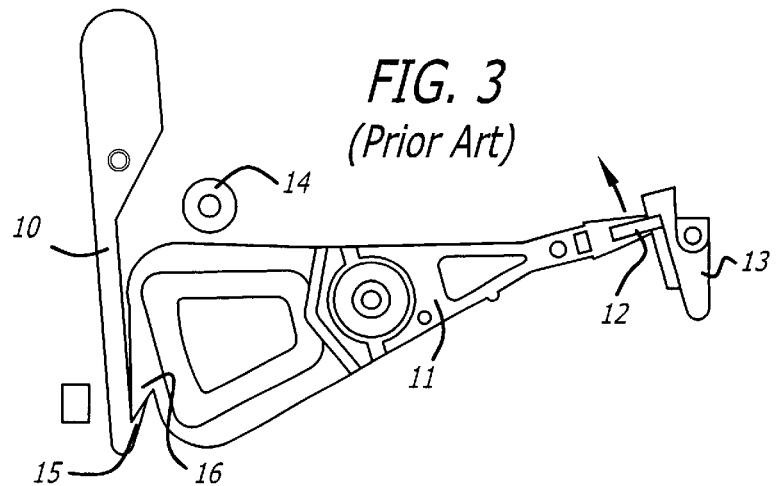
Figure 4:
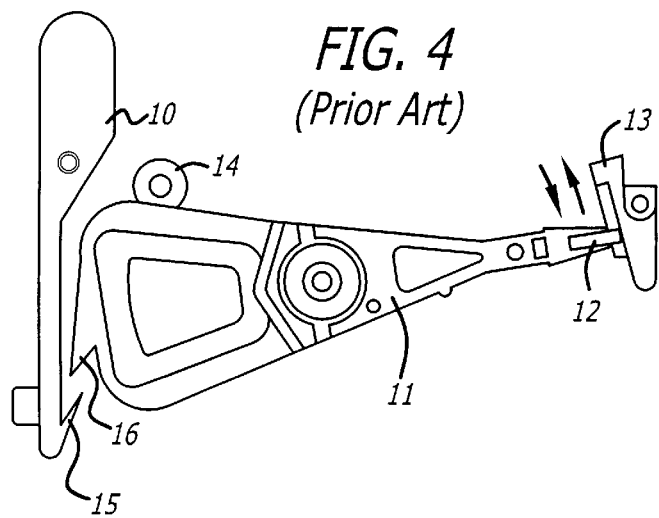
Figure 5:
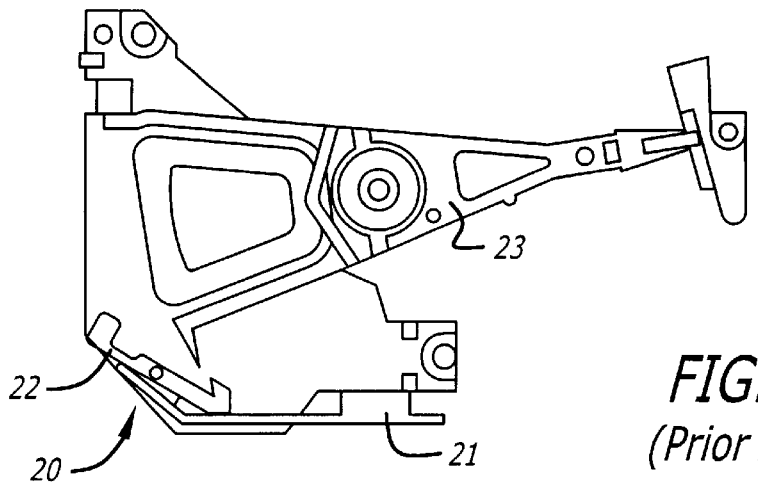
FIGS. 5–7 are top views of another hard disk drive actuator arm assembly of the prior art.
Figure 6:
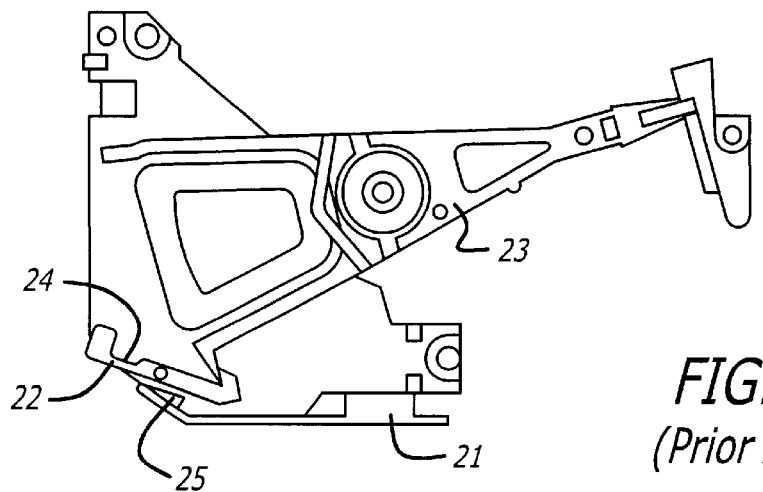
Figure 7:
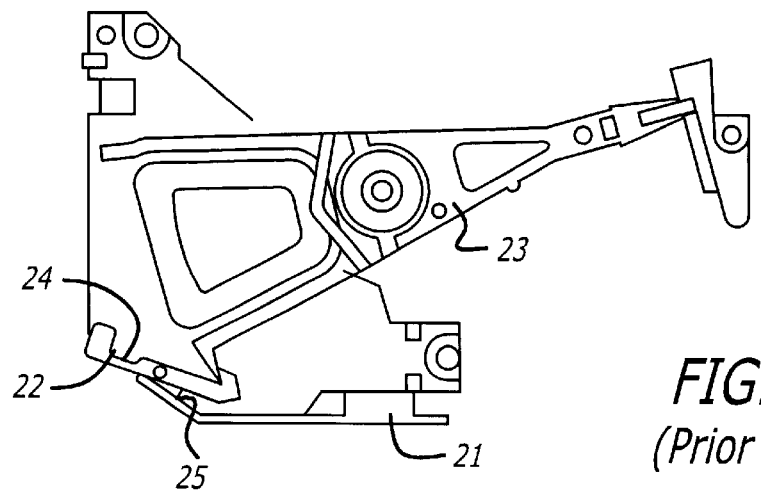
Figure 9:
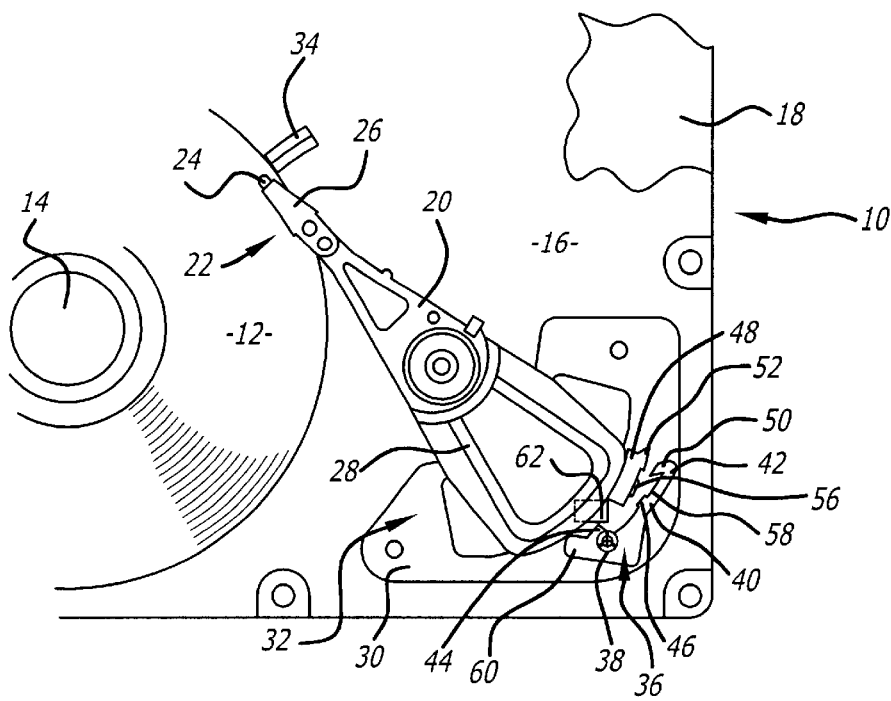
FIG. 9 is a top view of an actuator arm and latch in an unlatched position.

Referring to the drawings more particularly by reference numbers, FIG. 9 shows an embodiment of a hard disk drive 10 of the present invention. The hard disk drive 10 may include one or more disks 12 that are rotated by a spindle motor 14. The spindle motor 14 may be mounted to a base plate 16. The drive 10 may also have a cover 18 that is attached to the base plate 16 and encloses the disks 12.

An actuator arm 20 may be pivotally mounted to the base plate 16. A plurality of head gimbal assemblies (HGAs) 22 may be attached to the actuator arm 20. Each HGA 22 may include a head 24 that is gimbal mounted to a flexure beam 26. The flexure beams are attached to the actuator arm 20. The heads 24 contain one or more transducers (not shown) that can magnetize and sense the magnetic field of the disks 20 to write and read information, respectively.

The disk drive 10 may include a voice coil 28 that is attached to the actuator arm 20 and coupled to a magnet assembly 30. The voice coil 28 and magnet assembly 30 define a voice coil motor 32 that can be energized to pivot the actuator arm 20 and move the heads 24 across the disks 12. The heads 24, spindle motor 12 and voice coil motor 32 may all be controlled by electronic circuits (not shown) that operate the disk drive, as is known in the art.

When the disk drive 10 is not storing or accessing information, the voice coil motor 32 may be energized to move the heads 24 away from the disks 12 and onto a ramp 34 that is mounted to the base plate 16.

The disk drive 10 may have a latch 36 that prevents the heads 24 from moving off of the ramp 34 and onto the disks 20. The latch 36 may be pivotally mounted to the base plate 16 by a bearing assembly 38. The latch 36 may include an arm 40 that has a catch portion 42, a pusher portion 44 and a crash stop portion 46. The catch portion 42 can engage a corresponding latch portion 48 of the actuator arm 20. The catch portion 42 may have a hook 50 that catches a barb 52 of the latch portion 48.

Figure 10:
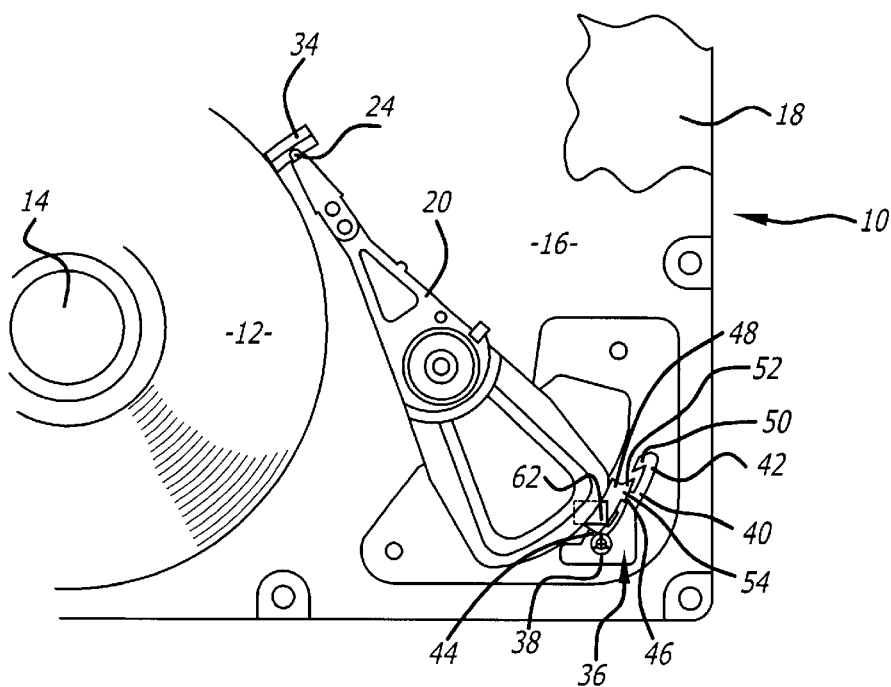
FIG. 10 is a top view of the actuator arm and latch moving into a latched position.

As shown in FIG. 10, when the disk drive 10 has a clockwise rotational acceleration, the actuator arm 20 and latch 36 will rotate in a counterclockwise direction. The latch portion 48 has an extended bearing portion 54 that makes contact with the crash stop portion 46 of the latch 36. The latch portion 48 may include a metal insert 56 that is attracted to one or more magnets 58 of the magnet assembly 30 located adjacent to the crash stop portion 46. The insert 56 is attracted to the magnets 58 so that the bearing portion 54 engages the crash stop portion 46.

The crash stop 46 and pusher portions 44 prevent the latch from bouncing off of the latch portion 48 and rotating in a clockwise direction away from the actuator arm 20. Continued counterclockwise rotation of the actuator arm 20 will cause the barb 52 to lock into the hook 50 and prevent further movement of the arm 20. The location and construction of the latch 36 is such that the heads 24 do not move onto the disks 20 when the hook 50 is engaged with the barb 52. When rotational acceleration ceases, the latch 36 has a metal insert 60 that is attracted to a magnet 62 which pulls the latch arm away from the latch portion 48 so that the actuator arm 20 can be loaded onto the disks for subsequent operation.

When the disk drive 10 undergoes a counterclockwise rotation, the actuator arm 20 and latch 36 move in clockwise direction until the latch portion 48 strikes the pusher portion 44. The actuator arm 20 will push the pusher portion 44 so that the latch 36 rotates in a counterclockwise direction until the barb 52 again engages the hook 50. The latch 38 thus provides a bi-directional device that integrates a crash stop to eliminate an additional piece part.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A latch for an actuator arm of a hard disk drive, comprising:
    an arm that has a catch portion, a pusher portion, and a crash stop portion located between said catch and pusher portions.

2. The latch of claim 1, further comprising a metal tab attached to said arm.

3. The latch of claim 1, wherein said catch portion includes a hook.

4. An actuator arm latch assembly for a hard disk drive, comprising:
    a base plate;
    an actuator arm pivotally connected to said base plate, said actuator arm having a latch portion;
    a latch that can be coupled to said latch portion of said actuator arm, said latch including an arm which has a catch portion, a pusher portion, and a crash stop portion located between said catch and pusher portions.

5. The assembly of claim 4, further comprising a magnet coupled to a metal tab of said latch arm.

6. The assembly of claim 4, further comprising a magnet coupled to a metal tab of said latch portion of said actuator arm.

7. The assembly of claim 4, wherein said catch portion includes a hook.

8. A hard disk drive, comprising:
    a base plate;
    a spindle motor mounted to said base plate;
    a disk coupled to said spindle motor;
    an actuator arm pivotally connected to said base plate, said actuator arm having a latch portion;
    a head that is mechanically coupled to said actuator arm and magnetically coupled to said disk;
    a voice coil motor that is coupled to said actuator arm and can move said head relative to said disk, said voice coil motor having a magnet assembly;
    a latch that can be coupled to said latch portion of said actuator arm, said latch including an arm which has a catch portion, a pusher portion, and a crash stop portion located between said catch and pusher portions.

9. The hard disk drive of claim 8, further comprising a magnet coupled to a metal tab of said latch arm.

10. The hard disk drive of claim 8, further comprising a magnet coupled to a metal tab of said latch portion of said actuator arm.

11. The hard disk drive of claim 8, wherein said catch portion includes a hook.

12. A hard disk drive, comprising:

a base plate;

a spindle motor mounted to said base plate;

a disk coupled to said spindle motor;

an actuator arm pivotally connected to said base plate;

a head that is mechanically coupled to said actuator arm and magnetically coupled to said disk;

a voice coil motor that is coupled to said actuator arm and can move said head relative to said disk, said voice coil motor having a magnet assembly;

latch means for securing said actuator arm.

13. The hard disk drive of claim 12, wherein said latch means includes a latch arm that has a catch portion, a pusher portion and a crash stop portion.

14. The hard disk drive of claim 13, further comprising a magnet coupled to a metal tab of said latch arm.

15. The hard disk drive of claim 14, further comprising a magnet coupled to a metal tab of a latch portion of said actuator arm.

16. The hard disk drive of claim 14, wherein said catch portion includes a hook.

17. A method to latch an actuator arm of a hard disk drive, comprising:

rotating an actuator arm until the actuator arm engages a crash stop portion and a pusher portion of a latch, the crash stop portion being located between the pusher portion and a catch portion of the latch; and, rotating the actuator arm until the actuator arm engages the catch portion of the latch.

18. The method of claim 17, further comprising biasing the actuator arm into the crash stop portion.

19. The method of claim 17, further comprising biasing the actuator arm away from the latch.

* * * * *